(12) United States Patent
Tiourine et al.

(10) Patent No.: US 7,668,744 B2
(45) Date of Patent: Feb. 23, 2010

(54) METHOD AND SYSTEM FOR CONDUCTING FLEET OPERATIONS (75) Inventors: Serguei Romualdovich Tiourine, Gothenburg (SE); Andreas Patrik Garsell, Gothenburg (SE); Darren Dejun Hang, Gothenburg (SE); Fredrik Ingemar Johansson, Askim (SE); Tapani Ensio Utriainen, Gothenburg (SE)

(73) Assignee: The Boeing Company, Chicago, IL (US)

( * ) Notice: Subject to any disclaimer, the term of this patent is extended or adjusted under 35 U.S.C. 154(b) by 1175 days.

(21) Appl. No.: 10/631,600

(22) Filed: Jul. 31, 2003

(65) Prior Publication Data

US 2005/0027579 A1    Feb. 3, 2005

(51) Int. Cl.
*G05B 19/418* (2006.01)
*G06F 9/46* (2006.01)

(52) U.S. Cl. ....................................................... 705/8
(58) Field of Classification Search ............... 705/8
See application file for complete search history.

(56) References Cited

U.S. PATENT DOCUMENTS

| | | | | |
|---|---|---|---|---|
| 4,949,267 | A * | 8/1990 | Gerstenfeld et al. ......... | 701/120 |
| 5,343,388 | A | 8/1994 | Wedelin ..................... | 364/402 |
| 5,652,867 | A | 7/1997 | Barlow et al. ............... | 395/500 |
| 5,692,175 | A | 11/1997 | Davies et al. ............... | 395/603 |
| 5,745,880 | A | 4/1998 | Strothmann ................. | 705/7 |
| 5,761,494 | A | 6/1998 | Smedley et al. ............. | 395/604 |
| 5,761,661 | A | 6/1998 | Coussens et al. ............ | 707/9 |
| 5,764,981 | A | 6/1998 | Brice et al. ................. | 395/671 |
| 5,787,412 | A | 7/1998 | Bosch et al. ............... | 707/2 |
| 5,870,711 | A | 2/1999 | Huffman .................... | 705/8 |
| 5,893,093 | A | 4/1999 | Wills ......................... | 707/5 |

(Continued)

FOREIGN PATENT DOCUMENTS

EP    0 762 306 A2    3/1997

(Continued)

OTHER PUBLICATIONS

Clausen, Jens, Jesper Hansen, Jesper Lasen, and Allen Larsen. "Disruption Management." OR/MS Today Oct. 2001. May 22, 2008 <http://www.lionhrtpub.com/orms/ORMS-search.shtml>.*

(Continued)

*Primary Examiner*—Beth V Boswell
*Assistant Examiner*—Folashade Anderson
(74) *Attorney, Agent, or Firm*—Harness, Dickey & Pierce, P.L.C.

(57) ABSTRACT

A fleet engine, a crew engine, a passenger engine and an integration engine that communicate with a distributed computer network via two-way communication channels to monitor and repair disruptions to schedules particularly in the airline industry. When a disruption occurs, the method will produce a plurality of solutions that are structurally different for evaluation by the controller or operations manager. The method of generating solutions includes two phases. A first phase with artificially relaxed costs and a second phase with costs that reflect the policies and actual costs of the relevant activities. Upon creating structurally different solutions, the method evaluates the solutions and presents summary information about the solutions to the operations manager. If a violation of a rule occurs in a solution, an alert is generated to notify a user of the rule violation.

19 Claims, 3 Drawing Sheets

U.S. PATENT DOCUMENTS

| | | | |
|---|---|---|---|
| 5,901,287 A | 5/1999 | Bull et al. | 395/200.48 |
| 5,995,943 A | 11/1999 | Bull et al. | 705/14 |
| 6,003,808 A | 12/1999 | Nguyen et al. | |
| 6,076,067 A | 6/2000 | Jacobs et al. | 705/7 |
| 6,085,164 A | 7/2000 | Smith et al. | 705/5 |
| 6,122,620 A | 9/2000 | Weber | 705/6 |
| 6,122,642 A | 9/2000 | Mehovic | 707/104 |
| 6,125,312 A | 9/2000 | Nguyen et al. | |
| 6,199,104 B1 | 3/2001 | Delph | 709/208 |
| 6,208,975 B1 | 3/2001 | Bull et al. | 705/14 |
| 6,229,534 B1 | 5/2001 | Gerra et al. | 345/335 |
| 6,253,200 B1 | 6/2001 | Smedley et al. | 704/4 |
| 6,286,029 B1 | 9/2001 | Delph | 709/203 |
| 6,330,617 B1 | 12/2001 | Bamforth et al. | 709/246 |
| 6,356,934 B1 | 3/2002 | Delph | 709/204 |
| 6,418,428 B1 | 7/2002 | Bosch et al. | 707/2 |
| 6,442,526 B1 | 8/2002 | Vance et al. | 705/5 |
| 6,470,394 B1 | 10/2002 | Bamforth et al. | 709/241 |
| 6,529,620 B2 | 3/2003 | Thompson | |
| 6,567,729 B2 | 5/2003 | Betters et al. | |
| 6,725,137 B2 | 4/2004 | Eagleton et al. | |
| 6,728,610 B1 | 4/2004 | Marshall et al. | |
| 6,738,748 B2 | 5/2004 | Wetzer | |
| 6,772,098 B1 | 8/2004 | Stark et al. | |
| 6,816,762 B2 | 11/2004 | Hensey et al. | |
| 6,847,872 B2 | 1/2005 | Bodin et al. | |
| 6,885,921 B1 | 4/2005 | Farmer | |
| 6,901,318 B1 | 5/2005 | Morronigiello et al. | |
| 6,952,828 B2 | 10/2005 | Greene | |
| 6,965,816 B2 | 11/2005 | Walker | |
| 7,006,903 B2 | 2/2006 | Smith et al. | |
| 7,031,941 B2 | 4/2006 | Garrow et al. | |
| 7,053,767 B2 | 5/2006 | Petite et al. | |
| 7,068,301 B2 | 6/2006 | Thompson | |
| 7,069,121 B1 | 6/2006 | Cummings, Jr. et al. | |
| 7,069,261 B2 | 6/2006 | Ahl et al. | |
| 7,111,035 B2 * | 9/2006 | McClellan et al. | 709/201 |
| 2002/0065601 A1 * | 5/2002 | Greenstein | 701/202 |
| 2003/0191678 A1 | 10/2003 | Shetty et al. | |
| 2004/0010432 A1 | 1/2004 | Matheson et al. | |

FOREIGN PATENT DOCUMENTS

| | | |
|---|---|---|
| EP | 0 881 553 A1 | 12/1998 |
| EP | 1 072 991 A2 | 1/2001 |
| EP | 1 079 204 A1 | 2/2001 |
| JP | 9-245097 | 9/1997 |
| WO | WO 92/03905 | 3/1992 |
| WO | WO 97/30404 | 8/1997 |
| WO | WO 97/37314 | 10/1997 |
| WO | WO 98/13773 | 4/1998 |
| WO | WO 98/35469 | 8/1998 |
| WO | WO 98/49633 | 11/1998 |
| WO | WO 98/49634 | 11/1998 |
| WO | WO 98/49635 | 11/1998 |
| WO | WO 99/44155 | 9/1999 |
| WO | WO 99/44160 | 9/1999 |
| WO | WO 00/13124 | 3/2000 |
| WO | WO 00/46683 | 8/2000 |
| WO | WO 00/57331 | 9/2000 |
| WO | WO 00/58892 | 10/2000 |
| WO | WO 01/16837 | 3/2001 |
| WO | WO 01/29693 | 4/2001 |
| WO | WO 01/37186 | 5/2001 |
| WO | WO 01/40901 | 6/2001 |
| WO | WO 01/77958 | 10/2001 |
| WO | WO 02/07001 | 1/2002 |
| WO | WO 02/17203 | 2/2002 |
| WO | WO 02/21387 | 3/2002 |
| WO | WO 02/27505 | 4/2002 |
| WO | WO 02/065234 | 8/2002 |
| WO | WO 02/065368 | 8/2002 |
| WO | WO 02/077925 | 10/2002 |
| WO | WO 02/082234 | 10/2002 |
| WO | WO 03/003271 | 1/2003 |
| WO | WO 03/007525 | 1/2003 |
| WO | WO 03/032119 | 4/2003 |
| WO | WO-2005/071581 A1 | 8/2005 |

OTHER PUBLICATIONS

Clarke, Michael. The Airline Schedule Recovery Problem. Diss. Univ. of Montreal, 1997. May 22, 2008 <http://web.mit.edu.heart/Public/www/wp2.pdf>.*

"Products." Carmen Systems Resources in Balance. May 23, 2002. retrieved from : http://web.archive.org/web/*/www.carmensystems.com. May 22, 2008 <www.carmensystems.com>.*

Fahle, Torsten, Rainer Feldmann, Silvia Gotz, Sven Grothklags, and Burkhard Monien. "The Aircraft Sequencing Problem." Computer Science in Perspective Essays Dedicated to Thomas Ottmann (Lecture Notes in Computer Science). 2598 (2003): 152-66. Print.*

Waltz, Edward L. "Information Understanding: Integrating Data Fusion and Data Mining Processes". vol. 6, Ann Arbor, Michigan, May 31-Jun. 3, 1998, pp. 553-556.

Mathaisel, Dennis F.X. "Decision Support for Airline System Operations Control and Irregular Operations", Computers Ops. Res., vol. 23, No. 11, pp. 1083-1098, 1996, XP-002254476.

International Search Report dated May 4, 2005, issued in corresponding International Application No. PCT/EP2005/000756.

Clarke, Michael INFORMS Atlanta Fall Meeting "Development of Heuristic Procedures For Flights ReScheduling in The Aftermath of Irregular Airline Operations" Nov. 5, 1996.

* cited by examiner

METHOD AND SYSTEM FOR CONDUCTING FLEET OPERATIONS

BACKGROUND OF THE INVENTION

1. Field of the Invention

The subject disclosure relates to methods and systems for scheduling and rescheduling resources used to accomplish activities, and more particularly to an improved method and system for scheduling and rescheduling fleet vehicles before, during and after a disruption in operation.

2. Background of the Related Art

Businesses in many areas utilize resources in complicated schedules to accomplish activities. For example, airlines, railways, buses, production lines and hospitals all have various resources including vehicles, machinery, floor space and personnel that must be coordinated on a grand scale. However, the schedules are subject to change based upon circumstances beyond the businesses control, profit objectives, policy changes and otherwise. When such disruptions occur, operations managers are typically unable to quickly and efficiently reschedule continuing operations without aid. In view of the above, several systems have been developed to aid decision making by proposing options for reallocating resources to achieve completion of the necessary activities. Such aids have been widely used and well understood in areas as diverse as airlines, railways, supply chains and logistics. Some examples are illustrated in U.S. Pat. No. 6,314,361, European Patent App. No. 1,195,670 and PCT Patent App. No. WO 02/097570 which are incorporated herein by reference.

There are problems associated with the systems and methods of the prior art. Many algorithms are well know that apply operations to produce every combination in the neighborhood and pick the cheapest solution. However, this brute force approach may take unduly long as the size of the neighborhood may require execution of a large number of operations and a small "optimality gap" is acceptable to expedite selecting a solution. The "optimality gap" is the difference between a low cost solution that may be found quickly and an optimal solution that may take tremendous effort to find. Typically, prior art systems are designed to find a solution for a very large scale problem resulting from a major disruption. Moreover, such systems and methodology often take unacceptably long intervals to develop solutions which remain suboptimal. Although a plurality of solutions may be offered to the operations manager, the plurality tend to be minor variations upon the same solution rather than significantly different alternatives. There is a need, therefore, for an improved system and method which approaches optimally solving disruptions with a focus on the typical day to day minor disruptions and, yet is scalable to assist in very larger scale disruptions. Such an improved system would offer a plurality of structurally different solutions.

Additionally, operations may involve multiple coordinated resources. For example, in the airline industry, operations managers often have to reschedule aircraft fleets as well as significant rescheduling of airline crews and passengers. Heretofore, an optimization aid used for one resource has been unable to interact with other optimization aids for the related resources. As a result, significant resources and valuable time are consumed pursuing rescheduling that is acceptable for utilizing one resource but completely unacceptable when the total impact is considered.

For example, U.S. Pat. No. 6,314,361 to Yu et al. shows an optimization server that processes a request from a user for optimal solutions to a specific flight schedule disruption. In response to the request, the optimization server initiates an aircraft optimization engine. The aircraft optimization engine processes the request and generates a set of solutions to overcome the disruption. In turn, the aircraft optimization engine initializes a crew optimization engine to determine whether the set of flight solutions are efficiently supported by flight and service crews. Many of the solutions or options produced by the aircraft optimization engine, although reasonably optimized in consideration of aircraft utilization, turn out to be wholly unacceptable options when viewed in light of the ramifications upon crew and passenger inconvenience. Thus, critical resources and time are utilized to produce and evaluate solutions which are unacceptable and must be discarded. Accordingly, what is also needed is an integrated operations framework which allows information to be exchanged among different resource optimization engines prior to generating solutions to yield an overall optimum solution without expending critical resources on solutions directed to a portion of the solution without considering the whole.

SUMMARY OF THE INVENTION

The present invention is directed to a method for generating a plurality of structurally different solutions with an optimization engine using recovery operations. The method includes the steps of periodically loading schedule data into the optimizaton engine and receiving a disruption specification and request for rescheduling from an operations manager. Upon receipt of the request, the optimization engine generates a plurality of solutions by using a local search algorithm in at least two phases. The first phase has an artificially relaxed cost and the second phase has normal costs that reflect policies and dollar values associated with corresponding activities. The plurality of solutions are evaluated and the most promising of the plurality of solutions are presented to the operations manager.

It is an object of the disclosure to produce a plurality of solutions to major and minor disruptions as quickly as possible with as little change as possible while minimizing airline policy violations.

It is another object of the disclosure to investigate variable constraints in a multi-phase approach to arrive at structurally different solutions.

It is another object of the disclosure to limit the solution to one optimization engine's area of operation and simply evaluate the effect upon the other areas of operation.

Still another embodiment of the present invention is a method for decomposing a disruption within an airline to facilitate generating optimal or near optimal solutions on a day of operations. The method utilizes fleet resources, crew resources and passenger schedules that are accessible by an integration server in communication with fleet, crew and passenger optimization engines. The crew and passenger optimization engines preprocess schedule information to generate initial data, wherein the initial data includes penalty cost values based upon hard and soft constraints plus costs based upon activities. The integration server receives a disruption specification and forwards the disruption specification to the fleet optimization engine. The initial data and the disruption specification are provided to the fleet optimization engine and used to prevent creating undesirable solutions by the fleet optimization engine. In effect, the initial data provides information about the flexiblity in the existing schedule of various operational areas, which will be valid for possible disruption specifications. During disruption processing one solver can request other solvers to generate solutions satisfying certain additional constraints. For example, a passenger solver can request a fleet upgrade (e.g., a larger aircraft) on a particular flight from the fleet solver to accommodate disrupted passengers.

It is an object of the present disclosure to yield an overall feasible solution with minimal potential for an optimality gap. It is another object of the disclosure to guarantee the feasibility and effectiveness of solutions for the entire operation by integrating a plurality of components in an environment. It is another object of the disclosure to generate good quality solutions based upon lowest total penalty cost value.

It is yet another object of the present disclosure to encapsulate each optimization engine's specific data and rules within the respective optimization engine. The optimization engines can communicate by exchanging solutions for evaluation across other optimization engines to yield a solution that is acceptable from an overall business perspective. Each optimization engine evaluates the impact of a solution within the corresponding area of operations. To reduce the number of solutions that an optimization engine must consider, any given optimization engine is advantageously designed to consider the other optimization engine's constraints and objectives.

It should be appreciated that the present disclosure can be implemented in numerous ways, including without limitation as a process, an apparatus, a system, a device, a method, or a computer readable medium for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the drawings wherein.

DETAILED DESCRIPTION OF PREFERRED EMBODIMENTS

The present invention overcomes many of the prior art problems associated with optimization engines. The advantages, and other features of the system and method disclosed herein, will become more readily apparent to those having ordinary skill in the art from the following detailed description of certain preferred embodiments taken in conjunction with the drawings which set forth representative embodiments of the present invention.

Figure 1:
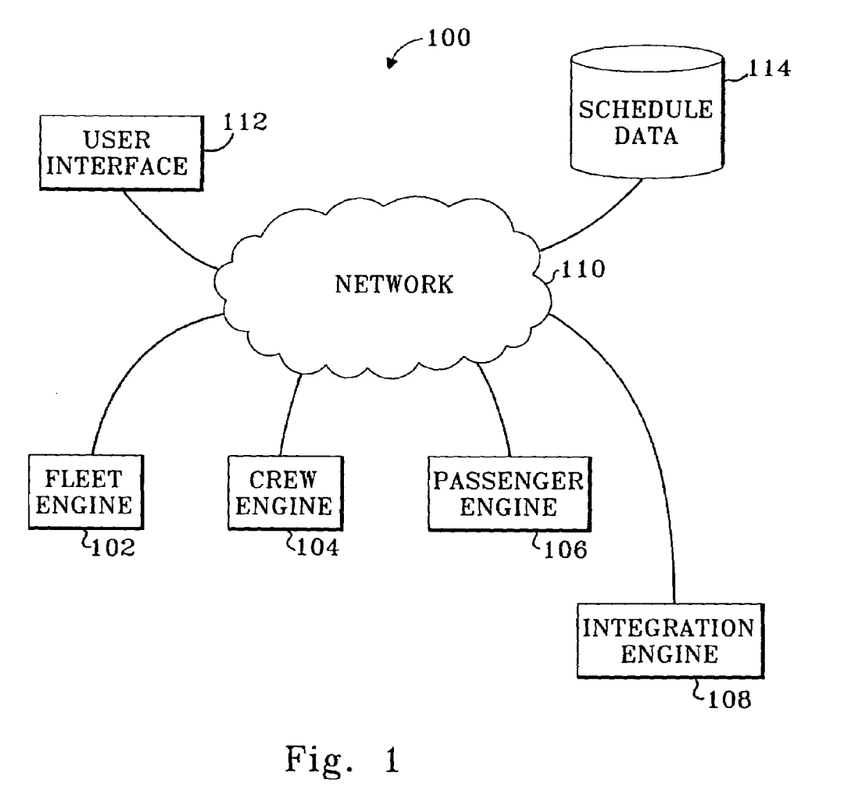
FIG. 1 an overview of an environment in which an embodiment of the present invention may be used.

Referring to FIG. 1, there is illustrated a schematic representation of an environment 100 in which the system and method of the present invention may be implemented. The exemplary environment 100 relates to the airline industry and, for simplicity, the following description relates to one airline operating the environment 100. The environment 100 includes a fleet engine 102, a crew engine 104, a passenger engine 106 and an integration engine 108 which communicate with a distributed computer network 110 via two-way communication channels. Note that the two-way communication channels are representative of a number of different communication channels known in the art such as telephone lines, optical cables, radio frequency, satellite and other means of transmission now known and later developed. When a disruption occurs, the subject system and method will produce a plurality of solutions that are structurally different for evaluation by the controller or operations manager.

Each engine 102, 104, 106 stores a set of parameters related to resource utilization with associated costs. The costs are actual monetary costs and user selectable penalty value costs that reflect the user's business policies and objectives. Each engine 102, 104, 106 also contains feasibilty and legality information related to utilization of the resources. The integration engine 108 exchanges data between other engines 102, 104, 106 to yield integrated solutions.

It is envisioned that each of the engines 102, 104, 106, 108 may incorporate one server or multiple servers. Multiple servers can cooperate to facilitate greater performance and stability of the subject invention by distributing memory and processing as is well known. In another embodiment, the environment 100 will also include Disruption Manager servers [not shown] that are specific to particular operational areas. For example, an operations manager will be connected to a Fleet Disruption Manager server that provides access to relevant information and resources such as fleet engine data, operational alerts from the fleet engine and the like. In a preferred embodiment, the environment 100 includes a Disruption Manager server for each engine 102, 104, 106, 108. Distributed computer network 110 may include any number of network systems well known to those skilled in the art. For example, distributed computer network 110 may be a combination of local area networks (LAN), wide area networks (WAN), intranets or the Internet. The distributed computer network 110 not only allows the components of the environment 100 to communicate but components may be added and upgraded as desired. For example, a hub recovery engine [not shown] may be added to the environment 100 and utilized in an embodiment of the subject disclosure as would be appreciated by those of ordinary skill in the art. The design of the interface of the distributed computer network 110 places minimal requirements on components for facilitating integration. For example, the components may only need send and receive messages in a format which can be utilized by the other components. In a preferred embodiment, the distributed computer network 110 only requires that the components read and write Extended Mark-up Language ("XML") messages from an asynchronous queue.

A user interface 112 is connected to the network 110 for providing the operations manager with access to the engines 102, 104, 106, 108. When a disruption to the schedule occurs, the operations manager will provide the particulars of the disruption in a request for a solution to the engines 102, 104, 106, 108 via the interface 112. The particulars of the disruption are referred to as the "disruption specification". In a preferred embodiment, the operations manager can select a planning horizon within the disruption specification. The planning horizon is the period of time into the future that the solutions must consider. Thus, feasibility and legality are also considered within the planning horizon time frame. The part of the schedule that lies beyond the planning horizon is not checked for feasibility or legality. In a preferred mode, the default planning horizon is set as midnight on the current day of operation. Therefore, all schedule activities that begin within the planning horizon are verified for feasibility and legality. The user interface 112 is designed to work in a multi user environment. A user can log in to the environment 100 and receive a certain access level. For example, view only access will allow to the user to see the current state of the schedule and operational alerts, but not to modify such data.

Upon receipt of the request for solution with disruption specification, the engines 102, 104, 106, 108 begin the process of providing a rescheduling solution. The engines 102, 104, 106, 108 acquire the most recent schedule data from a memory storage system 114 and perform operations to generate a rescheduling solution as described in more detail hereinbelow. The memory storage system 114 is connected to the distributed computer network 110 by a two-way communication channel. Preferably, the data within the memory storage system 114 is maintained automatically. In order to allow a hot start of the engines 102, 104, 106, 108, the data within the memory storage system 114 is periodically downloaded to the engines 102, 104, 106, 108. Thus, when a request is received, the data synchronization merely involves the changes since the last refresh and, thereby, the data acquisition time is minimized. In a preferred embodiment, the data within the memory storage system 114 is downloaded to the engines 102, 104, 106, 108 every two minutes.

Figure 2:
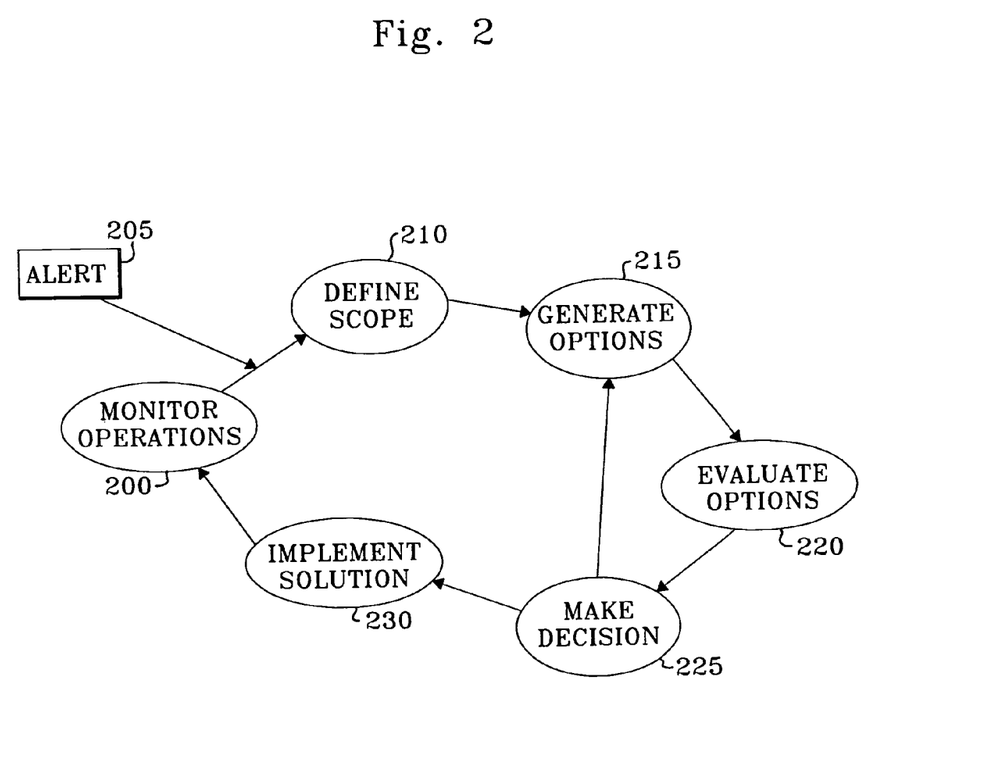
FIG. 2 is a flowchart illustrating a problem solving cycle in accordance with the subject disclosure.

Referring now to FIG. 2, a graphical representation of the problem solving cycle is shown. When no disruptions are present, the operations manager monitors operations at step 200. When a disruption occurs, data relating to the disruption is entered via user interface 112 and an alert is generated as denoted by action box 205. The cycle proceeds to define the scope of the disruption at step 210. Defining the scope of the disruption includes determining the time frame, severity and resources affected by the disruption to generate a disruption specification. In a preferred embodiment, the integration engine 108 receives the data relating to the disruption, accesses the schedule data in the memory storage system 114 and creates the disruption specification.

The overall feasibility, legality and quality issues are controlled using the integration engine 108. In one embodiment, the integration engine 108 includes a submodule for storing and processing rules. Rules are resource specific and preferably encapsulated within each engine, 102, 104, 106, 108. The rules may be hard rules that cannot be violated or soft rules that can be violated by assumption of a corresponding penalty. The rules in the integration engine 108 are all soft such that overall best solutions are acquired by adjusting soft costs and parameters of the other engines 102, 104, 106. By reviewing hard and soft rules for violations in the engines 102, 104, 106, the solutions that violate feasibility, legality and quality policies can be discarded prior to being provided to the operations manager for review. In another embodiment, the integration engine 108 filters, discards and rates the solutions prior to presentation to the operations manager. Similarly, the other engines 102, 104, 106 may utilize submodules for storing data and rules specific to the associated resource. In a preferred embodiment, the operations manager can introduce changes to the rules parameters within the rules submodules at short notice. By allowing changes to the rules submodules, changes to crew agreements, timetables, company policies, planning processes and the like can always be properly reflected in the solutions. Rules for aircraft are typically determined by the aircraft manufacturers with little, if any, variance there between so it is envisioned that changes would be infrequent. Example of hard rules are runway lengths, aircraft operating range, fuel capacity, number of seats available and the like whereas soft rules are maintenance intervals, turnaround time, curfews and the like.

At step 215, the integration engine 108 provides the disruption specification to each engine 102, 104, 106. Each engine 102, 104, 106 also preprocess based upon the schedule data 114. The initial information is provided to the integration engine 108 for access by the other engines. Typical initial information would be penalty value costs associated with actions related to recovering from the disruption. For another example, the fleet engine 102 generates initial information related to available standby aircraft, cancellation penalties, and preferred latest departure time for an aircraft affected by the disruption. The crew engine 104 generates initial information related to tight connection constraints for crews, cancellation penalty value cost and crew limitations such as latest departure times, also called crew drop-dead limit. The passenger engine 106 generates initial information related to flight values, passengers per class, connection constraints for passengers and cancellation penalty value costs. The passenger engine 106 may request a fleet upgrade to a larger aircraft on a particular leg to accommodate disrupted passengers. Preferably, the initial information does not include the details required to generate the feasibility, legality and cost (both real and penalty value) data. For example, detailed passenger information is required by the passenger engine 106 during the preprocessing however the fleet engine 102 and crew engine 104 do not require such detailed passenger information.

Preferably, the major preprocessing in the environment 100 is performed during off peak hours such as during the night with smaller preprocessing tasks being done hourly. The operations manager can also manually trigger preprocessing. In short, a goal of preprocessing is to perform so-called sensitivity analysis, i.e. to inhibit the inherent flexibility in the schedule. The results of the preprocessing are used for processing disruption requests. Additional preprocessing is not performed after receipt of a disruption request mainly due to time constraints. Such initial information of additional constraints provides for efficient use of resources in generating solutions.

After the preprocessing, the integration engine 108 may choose one or more engines 102, 104, 106 to generate solutions in view of the initial information. Moreover, as the selected engine or engines generate solutions, some solutions can be immediately discarded in view of feasibility, legality and excessive penalty problems identified by the other engines during preprocessing. Hence, the small amount of time spent preprocessing is more than saved by quickly discarding unacceptable solutions in view of initial information generated by the engines 102, 104, 106. In short, even though the solution may be acceptable when viewed in the limited scope of one area of resources, the subject system and method quickly discards some of these solutions if the solution is undesirable when the overall impact is considered.

In another embodiment, the integration engine 108 evaluates the disruption specification and identifies only one engine to generate solutions. In this exemplary embodiment, the integration engine 108 provides the disruption specification to the fleet engine 102. Initially the fleet engine 102 attempts to create a solution or solutions to the disruption without impacting other resources or schedules. Thus, evaluation of the solutions by the other engines 104, 106 will only take into account such actions as flight cancellations. As a result, the other engines 104, 106 may yield complex rescheduling solutions for their respective resources to accommodate the solutions. If the solutions must impact the other resources or schedules, the solutions are evaluated by the corresponding engines for feasibility, legality and penalty value cost at step 220. In still another embodiment, the integration engine 108 provides the disruption specification to one or more of the engines 102, 104, 106 for each to generate solutions in parallel with or without preprocessing as desired.

Still referring to step 215 of FIG. 2, the preferred method produces a plurality of structurally different solutions. For simplicity, the following disclosure is with respect to a single engine, the fleet engine 102, generating solutions but it will be appreciated by those of ordinary skill in the art that the principles may be advantageously used with the other engines 104 and 106. The fleet engine 102 uses resources, e.g., aircraft, to complete activities called "legs". A schedule is an assignment of an aircraft to a line of work wherein a line of work is an ordered set of legs. The fleet engine 102 uses a variety of operations to create a set of possible schedules or neighborhood. Typical recovery operations are flight delay, flight cancellation, aircraft type change and aircraft registration change. Each recovery operation incurs a user-specified penalty value cost. An aircraft having a fictitious line of work without any constraints may also be utilized by the fleet engine 102 when rescheduling to represent cancelled or unassigned flights.

Figure 3:
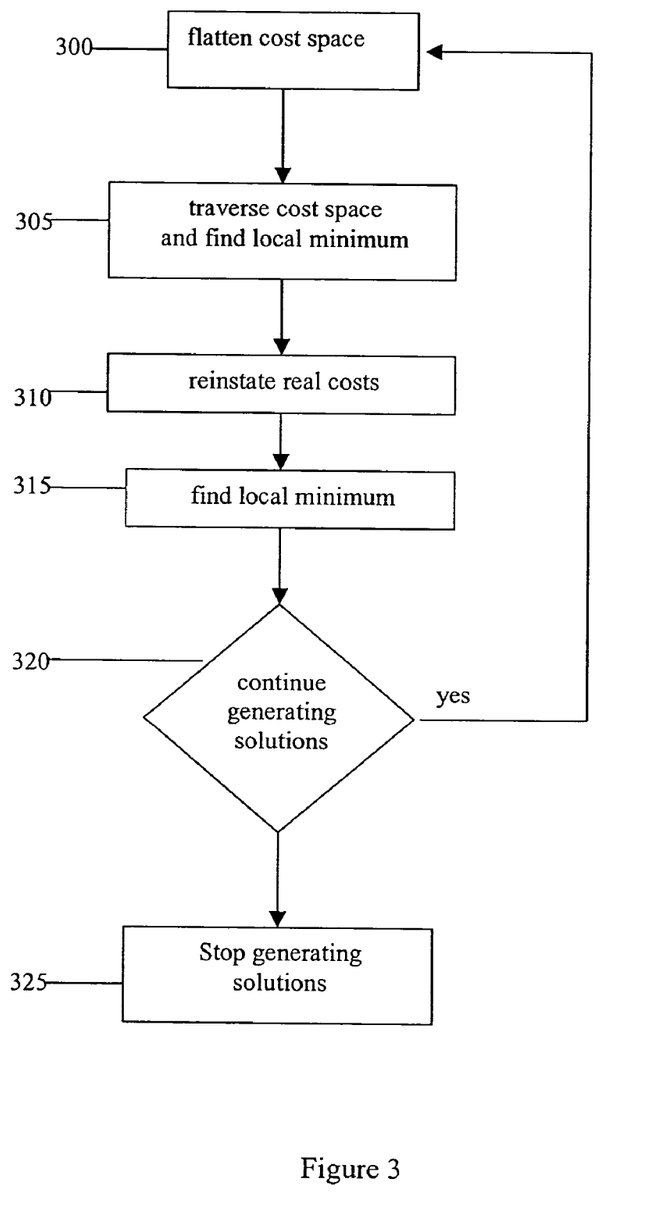
FIG. 3 is a flowchart illustrating in detail a method for generating solutions in accordance with the subject disclosure.

Referring now to FIG. 3, a method for generating structurally different solutions using a two-phase search is described in more detail. At step 300, the fleet engine 102 has the disruption specification and up-to-date schedule data from the memory storage system 114. Certain costs, preferably penalty value costs, are reduced to flatten the cost space. At step 305, the fleet engine 102 performs operations to develop a relaxed cost solution to the disruption until no further improvements to the solution are found. In effect, the fleet engine 102 traverses the flattened cost space to find a local minimum within the neighborhood.

At step 310, the fleet engine enters the second phase of the procedure. The normal costs are reset to return the cost space to normal but the present location within the neighborhood does not change. At step 315, the fleet engine 102 begins operations from the relaxed cost solution within the cost space to determine a local minimum. In a preferred embodiment, partial banning is also used at step 315 to generate a plurality of local minimums. The local minimums become solutions for later evaluation at step 220 of FIG. 2.

At step 320, the fleet engine 100 decides whether or not to continue looking for additional solutions. The criteria for continuing the optimization process can be varied. For example, a certain number of variations may need to be run, a certain number of different solutions may be required or a time limit can stop the process. If the criteria for stopping has occurred, the fleet engine proceeds to step 325 and the generation of solutions stops. From step 325, the fleet engine 102 returns to step 220 of FIG. 2.

At step 320, if the stop criteria has not occurred, the fleet engine 102 returns to step 300. On subsequent passes through step 300, different costs are modified. This varies the cost space in different ways so that in step 305, the fleet engine 102 performs operations which lead to different areas of the cost space. Then, as the fleet engine proceeds through steps 310 and 315, a structurally different solution is likely because the relaxed cost solution starting point is likely a different area within the cost space after the first phase. To further illustrate by example, the fleet engine 102 may consider swaps, insertions and/or recombinations with no penalty value cost associated with missed maintenance on a certain aircraft to yield one structural solution on a first pass through steps 300 and 305. On subsequent passes through steps 300 and 305, different aircraft will have a relaxed penalty cost value to likely arrive at a different modified cost structural solution starting point for step 315.

In another embodiment, additional phases are incorporated with relaxed and/or tightened costs prior to the resetting of the costs to determine the local minimum. In another embodiment, the first phase involves randomly picking points within the cost space and, during phase two, finding a local minimum to arrive at structurally different solutions.

In still another embodiment, the multi-phase search approach is utilized to have the solutions reflect different recovery characteristics. A recovery characteristic would be to prefer swaps over delays by increasing the penalty value cost associated with delays. This favoring would be accomplished by having sets of temporary costs to be utilized in the first phase wherein the relationship between the sets would be orthogonal, i.e. drive the local search in different directions within the cost space. In addition to the initially preprocessed information, the engines 102, 104, 106 may exchange a partial solution which can be completed by another engine to generate a solution with a required property. For example, while evaluating a particular recovery solution from fleet engine 102, the passenger engine 106 may identify a significant improvement of the corresponding passenger recovery solutions if a certain flight is upgraded to a larger aircraft. In this case, the passenger engine 106 may respond by suggesting an alternative solution, which includes the suggested flight upgrade. Accordingly, the fleet engine 102 collaborates with crew engine 104 and passenger engine 106 to arrive to the overall best solutions such that feasible operations within the crew engine 104 and passenger engine 106 can be favored.

The fleet engine 102 may use one or more of several search algorithms and techniques. The search algorithms may be the same for each phase or different. In a preferred embodiment, a steepest-descent algorithm is utilized to find solutions in both phases. In another embodiment, a SIMPLEX algorithm is utilized. It is envisioned that any commercially available, general purpose network and integer program optimization algorithm may be advantageously used by the fleet engine 102 as would be appreciated by one of ordinary skill in the pertinent art.

An additional variation is to precalculate which swaps may be beneficial. For example, swaps with large time differences will incur such a large penalty value that cancellations will remedy the problem on that line of work for a lower cost. Thus, cancellation costs can be used to prune the set of possible swaps and, in turn, decrease the size of the neighborhood. A smaller neighborhood increases search efficiency and prevents unacceptable solutions from being found. Another pruning technique is to only consider swaps or insertions that touch a line of work that is already affected by the disruption. In effect, the lines of work that do not need to be modified are left intact. It will be appreciated that the benefits of reducing the neighborhood by these and other techniques may be incorporated into the preprocessing by the engines 102, 104, 106 in order to further increase the efficiency of the preferred method.

Still another variation to arrive at different starting points within the cost space is to use purely cost variation schemes. By assigning different penalty value costs and/or expenses to certain activities and operations, different points in the cost space may be found. Still another variation includes substitution of equal and/or substantially equal alternatives. For example, several swaps may have the same cost. To generate different solutions, the order in which the swaps are tried may be randomized. This scheme works well for smaller neighborhood scenarios.

Partial banning or taboo searching may also be utilized to arrive at structurally different solutions. Partial banning builds a tree of nodes wherein each node corresponds to a list of banned operations. The first or root node is created by generating a solution. For each operation used to generate the solution, a child node is attached. However, in each child node, one or more of the operations are banned. Thus, the options at each node will vary and, in turn, unique options will be generated. Partial banning may be integrated with or superimposed upon the multi-phase approach to further insure that structurally different solutions are generated. For example, within a particular iteration of a multi-phase approach, in which cancellations are favored over all other operations, partial banning will provide solutions with different flights cancelled. Hence, a multi-phase approach is used to generate structurally different solutions and partial banning provides still further variations. It is envisioned that the search methods and techniques above are not mutually exclusive.

Multiple processors can be used in parallel to apply different methods to the same disruption. Similarly, different processors can run in parallel and apply the same technique but utilize different sets of costs, different partial banning or different favored operations to further reduce computation time and increase stability.

Referring again to FIG. 2, at step 220, the integration engine 108 sends an evaluate solutions request to the engines that are working and receives the proposed solutions in response. In a preferred embodiment, the proposed solutions are presented to the operations manager for evaluation via the user interface 112. In another embodiment, the engines provide multiple solutions, ranked in order of ascending total cost. Preferably, the operations manager can specify an upper threshold on the total number of solutions to be proposed. To further expedite the optimization process, the operations manager can also specify an upper threshold on the number of solutions to be generated. Thus, whenever the fleet engine 102 has found the requested number of solutions, the fleet engine 102 compares the set of solutions in terms of total cost and proposes only the lowest cost solutions.

The operations manager needs to be able to compare one solution to another. Revenue, operational cost, profit and performance are key figures of merit in comparing solutions, but these figures are not all represented in monetary terms so a user selectable weighting is applied to allow quantitative comparison of proposed solutions. The basic principle in the weighting selection process is that the operations manager specifies penalty cost values associated with different recovery operations. In order to determine the total cost of a proposed solution, the system and method sums the number and nature of such occurrences appearing in the solution to determine total penalty value cost. The actual costs are also determined. Actual costs include, without limitation, fuel costs, passenger loads and passenger values. A solution with a lower sum total of penalty cost value and actual costs will be deemed better than a solution with a higher sum. The total cost of a solution is user variable because of the selected penalty value costs assigned to certain events like delays.

Preferably, the operations manager selects the penalty value costs based upon the policies and objectives of the airline. Accordingly, the objective of the fleet engine 102 to find a relatively low cost or even optimal solution would reflect those policies and objectives. Preferably, the fleet engine 102 provides a figure of merit for each solution to the operations manager wherein the figure of merit is the differential cost between the schedule before the disruption as compared to the schedule with the proposed solution implemented.

Preferably, the fleet engine 102 ranks the solutions that have been found and presents summary information in the form of an HTML document. The summary information includes the number of solutions found, the number of solutions displayed and the reason why the fleet engine 102 stopped searching such as the time limit was reached or the specified number of options was found. If the fleet engine 102 fails to propose a feasible solution, fleet engine 102 may propose a partial solution. A partial solution would involve one or more infeasibilities and the solver will identify such in the summary information. Preferably, the user interface also can communicate with the fleet engine 102, update databases such as the schedule data 114, review alerts generated by the engines and the like. In a preferred embodiment, the engines 102, 104, 106, 108 automatically generate alerts.

In another embodiment, the integration engine 108 provides the solutions to the crew engine 104 and passenger engine 106 to determine feasibility and legality under the constraints therein as well as additional actual cost and penalty value cost information. Thus, the integration engine 108 collects information for the set of solutions based upon total overall cost and provides ranked overall solutions to the operations manager via user interface 112. The operations manager may also request each engine 102, 104, 106 to fully evaluate the schedule of one or more solutions for any rule violations, i.e. send an alert generation request. The engine 102, 104, 106 will evaluate the selected solutions for violations and generate an alert for each violation of the rules. The operations manager can further utilize the alerts to select and implement a solution.

In another alternative embodiment, the integration engine 108 skips to step 230 and automatically implements the overall lowest cost solution by updating the schedule data 114 and utilizing the network to undertake remaining tasks such as notifying maintenance personnel, crews and passengers of schedule changes. It is envisioned that the notification may be made by updating Internet Web pages, automated telephonic communications by text messaging and otherwise, displays at the airport, electronic mail and other means of communication now known and later developed.

At step 225, the operations manager would take some or all of the solutions from the fleet engine 102 and provide them to the crew engine 104 and passenger engine 106. The crew engine 104 and passenger engine 106 process these solutions to provide feasibility and legality verification plus additional cost information. Thus, the operations manager can select an option based upon the overall cost. If the operations manager deems a solution acceptable for implementation, the process proceeds to step 230. If the operations manager does not find any of the solutions acceptable, the process can proceed to step 215 for generating additional solutions by utilization of another method or further application of the same methods as described above. At step 230, if a solution is acceptable, the solution is implemented. The airline reenters a monitoring operations mode at step 200 until another alert comes and the cycle continues.

In another embodiment, the system and methods shown herein are useful as a simulation tool. The operations manager may modify the rules and/or penalty value costs to reflect different policies and input hypothetical disruptions. Review of the resulting solutions would allow quantitative assessment of the overall cost of certain policies during disruptions. Based upon these assessments, effective policies can be identified and implemented. For example, the operations manager can investigate different trade-offs such as between a quick recovery and a low operational cost, or between minimum changes and a stable operation.

In another embodiment, the operations manager uses the system and methods herein to prepare cancellation plans based upon potential irregular operations. The cancellations plans can be evaluated by all resources in batch modes and real-time response would not be required. Thus, the optimality gap can be minimized or completely overcome. It is also envisioned that previous solutions may be stored for later use. If, at a later time, additional disruptions or the researched potential irregular operations occur, the stored solutions provide contingency plans for evaluation under the present circumstances without requiring additional generation of solutions by an optimization engine.

While the invention has been described with respect to preferred embodiments, those skilled in the art will readily appreciate that various changes and/or modifications can be made to the invention without departing from the spirit or scope of the invention as defined by the appended claims.

What is claimed is:

1. A method for generating a plurality of structurally different solutions using recovery operations, the method comprising the steps of:
   periodically loading schedule data into a plurality of optimization engines, each engine in communication via a computer network and configured to optimize disposition of one or more resources corresponding to the engine;
   each of the optimization engines preprocessing the loaded schedule data and a plurality of user-specified penalty value costs to predefine one or more penalty value costs associated with disposition of the one or more resources associated with the engine;
   receiving a disruption specification and request for rescheduling from a user;
   one or more of the optimization engines generating a plurality of solutions, the generating performed in a plurality of phases by:
      in a first phase, reducing one or more of the penalty value costs predefined by the engines to flatten a cost space for a neighborhood of possible schedules, and, using a first local search algorithm, traversing the flattened cost space to find a first local minimum representing a relaxed cost solution; and
      in a second phase, reinstating the one or more reduced penalty value costs to restore the cost space, and using a second local search algorithm, searching the restored cost space from the relaxed cost solution to find one or more second local minima representing one or more solutions for evaluation;
   one or more of the optimization engines evaluating the one or more solutions for evaluation generated by another of the engines, the evaluating performed relative to one or more resource-specific rules of the evaluating optimization engine underlying the one or more penalty value costs; and
   based on the evaluating, updating the schedule data.

2. A method according to claim 1, wherein the cost space includes a penalty value cost associated with violation of a policy.

3. A method according to claim 1, wherein the cost space includes a monetary amount associated with an activity.

4. A method according to claim 1, wherein one of the optimization engines operates on aircraft schedules and the cost space is modified to favor a desirable operation over a less desirable operation as determined by one of a passenger and crew optimization engine such that a preferred operation by the passenger and crew optimization engines is more likely to be utilized by a portion of the plurality of solutions.

5. A method according to claim 4, wherein the operations used by the aircraft optimization engine are flight delay, flight cancellation, aircraft type change and aircraft registration change.

6. A method according to claim 1, further comprising the steps of:
   receiving an alert generation request;
   evaluating the plurality of solutions based upon at least one rule for violations of the at least one rule; and
   generating an alert for each violation of the at least one rule.

7. A method according to claim 1, wherein the second phase uses a different local search algorithm from the first phase.

8. A method according to claim 1, wherein during a third phase, partial banning of operations is utilized.

9. A method according to claim 1, wherein the first local search algorithm starts from a randomly selected location.

10. A method according to claim 1, wherein the local search algorithm include a steepest-descent algorithm.

11. A method according to claim 1, further comprising the steps of:
   monitoring operation of the schedule;
   defining a scope of the disruption; and
   pruning a neighborhood of potential solutions.

12. A method according to claim 1, further comprising a first of the engines generating a partial solution; and a second of the engines evaluating the partial solution and proposing an alternative solution.

13. A method according to claim 1, further comprising the step of synchronizing the schedule data upon receipt of the disruption specification.

14. A method according to claim 1, further comprising modifying the cost space to obtain solutions in different areas of the cost space.

15. A method according to claim 11, wherein pruning the neighborhood comprises predetermining which of a plurality of possible swaps and/or insertions are beneficial and eliminating the other possible swaps and/or insertions.

16. A method according to claim 1, wherein the one or more solutions for evaluation include one or more partial solutions, the method further comprising one or more of the optimization engines completing a partial solution from another of the engines.

17. A method according to claim 1, further comprising the steps of evaluating the plurality of solutions and providing at least a portion of the plurality of solutions to the user.

18. A method according to claim 1, wherein the disruption specification includes a planning horizon.

19. A system for generating a plurality of structurally different solutions using recovery operations, the system comprising:
   a fleet optimization engine, a crew optimization engine, and a passenger optimization engine in communication via a computer network, the optimization engines configured to periodically receive schedule data for preprocessing by the engines with a plurality of user-specified penalty value costs to predefine one or more penalty value costs associated with disposition of resources associated with the optimization engines; and
   an integration engine for receiving a disruption specification and request for rescheduling from a user;
   each of the optimization engines configured to generate a plurality of solutions in a plurality of phases, each optimization engine configured to:
      in a first phase, reduce one or more of the penalty value costs predefined by the engines to flatten a cost space for a neighborhood of possible schedules, and, using a first local search algorithm, traverse the flattened cost space to find a first local minimum representing a relaxed cost solution; and
      in a second phase, reinstate the one or more reduced penalty value costs to restore the cost space, and using a second local search algorithm, search the restored cost space from the relaxed cost solution to find one or more second local minima representing one or more solutions for evaluation;
   each of the optimization engines further configured to evaluate, relative to one or more resource-specific rules of the evaluating optimization engine underlying the penalty value costs, solutions for evaluation generated by the other engines;
   the integration engine configured to select any or all of the optimization engines to generate at least some of the solutions.

* * * * *